2,957,239
BRAZING OF NICKEL BASE ALLOYS

Ross E. Pritchard, Meadowvale, Ontario, and Hans W. Hoefer, Willowdale, Ontario, Canada, assignors to Orenda Engines Limited, Ontario, Canada, a corporation No Drawing. Filed Dec. 10, 1958, Ser. No. 779,297

9 Claims. (Cl. 29—488)

This invention relates to methods of brazing nickel base alloys containing between about 3% and 8% total of aluminum plus titanium.

With the development of the gas turbine engine, various alloys were developed which would withstand the heat and stress encountered by components of such engines. However, difficulty has been encountered in welding or brazing components fabricated of such alloys. In particular, nickel base alloys containing aluminum and titanium have been especially difficult to braze due to the formation of aluminum and titanium oxides at brazing temperatures which cannot be dissolved in conventional brazing atmospheres to allow flow and wetting of the brazing alloy. Moreover, it has not been possible to use fluxes when brazing these alloys because the flux gets entrapped in the braze resulting in insufficiency of joint bond areas and loss of joint strength.

Up to the present time it has been considered impractical to braze successfully nickel base alloys containing between about 3% and 8% total of aluminum and titanium without using a flux or without nickel plating the surfaces to be brazed, which is expensive and not always convenient.

The object of the present invention is to provide a relatively simple and non-critical fluxless method of brazing components fabricated of such alloys without the necessity of plating the surfaces to be brazed.

It has been found that components formed of such nickel base alloys may be brazed by heat treating them preferentially to oxidize the aluminum and titanium in surface zones of the components, then removing the oxides from said zones without removing the remainder of the zones which are retained substantially intact, and finally brazing the components in an atmosphere of argon or helium having a dew point at least as low as —100° F.

As examples of the alloys which may be successfully brazed by means of the invention there is appended the following table showing the trade names of the alloys concerned together with their nominal chemical compositions:

appreciated by one skilled in the art that the above alloys are capable of solution heat treatment.

It has been found that these alloys may be brazed by the process generally described above. Components to be brazed are first heat treated preferentially to oxidize the aluminum and titanium in their surface zones. This oxidation may take place in air or any convenient oxidizing atmosphere and need not be effected in a closely controlled atmosphere. Preferably the components are heated at approximately the solution heat treating temperature of the alloy of which they are made. For the alloys listed above a suitable temperature range is between approximately 1900° F. and 2200° F. The components are heated for a period of time between approximately half-an-hour and four hours which is sufficient preferentially to oxidize the titanium and aluminum in the surface zones of the components to an oxide scale.

The oxide scale formed in the heat treatment is then removed from the surface zones of the components without removing the remainder of the surface zones, which are retained substantially intact. Conveniently the oxide scale may be removed by a chemical pickling etch and a convenient pickling etch has been found to consist of water, nitric acid and hydrofluoric acid in the following proportions: 1000 cc. of water, 1000 cc. of nitric acid and 150 cc. of hydrofluoric acid. It has been found for example that the scale can be removed by immersing the components in an etch of the above composition for approximately 20 minutes.

With the alloys in question the aluminum and titanium diffuse from the outer surfaces of the alloy during heating at the solution heat treating temperature in an oxidizing atmosphere to form a scale and to leave a surface layer from .0005 inch to .002 inch thick which has been depleted of aluminum and titanium. Removal of the oxide scale by pickling with the above-mentioned pickle or any other convenient pickle exposes this depleted layer which presents a surface which forms oxides which can be readily dissolved in dry argon or helium atmospheres at brazing temperatures so that the surface has excellent brazing characteristics. It is also found that the surface appears silver bright after the brazing cycle.

After the oxide scale has been removed, the components are brazed together in a brazing bell in an inert atmosphere consisting of argon or helium which has its dew point reduced at least as low as —100° F. and preferably between —160°–180° F.

EXAMPLE

Two specimens of Nimonic 90, having the composition above set forth, were brazed together by the following procedure. The specimens were heat treated in an oxidizing atmosphere at 2175° F. for one hour and were then rapidly cooled in air. This heat treatment had the

*Nominal compositions of nickel base alloys containing aluminum and titanium*

| Trade Name | Nickel | Chromium | Iron | Carbon | Molybdenum | Aluminum | Titanium | Silicon | Colombium +Tantalum | Cobalt |
|---|---|---|---|---|---|---|---|---|---|---|
| Inconel 702 | 78 | 16 | 1.0 | .02 | | 3.0 | .6 | .15 | | |
| Inconel X | 73 | 15 | 7.0 | .04 | | .8 | 2.5 | .30 | .85 | |
| Inconel 700 | 46 | 15 | 1.0 | .14 | 3 | 3.2 | 2.2 | .25 | | 29 |
| Nimonic 80, 80A | 75 | 20 | .5 | .05 | | 1.3 | 2.5 | .20 | | |
| Nimonic 90 | 57 | 20 | .5 | .05 | | 1.65 | 2.6 | .20 | | 17 |
| Nimonic 95 | 55 | 20 | 1.0 | .08 | | 2.0 | 2.9 | 1.0 Max. | | 18 |
| Hastelloy R 235 | 64 | 16 | 10.0 | .08 | | 2.5 | 2.5 | | | 1.5 |

It will be seen that all the alloys listed are nickel base alloys containing between 3% and 8% total of aluminum plus titanium but it is to be noted that this table is given by way of example and not of limitation. It will be result of preferentially oxidizing the titanium and aluminum in the surface zone of the specimens into an oxide scale. The oxide scale was removed from the heat treated specimens by immersing them for 20 minutes in a pickle consisting of 1000 cc. of water, 1000 cc. of nitric acid and 150 cc. of hydrofluoric acid. The specimens were then fusion tack welded together leaving a gap between them varying from a press fit to .004 inch which was maintained by a shim placed between the surfaces to be joined. A suspension of brazing powder and acrylic resin cement was applied to the specimens immediately prior to brazing.

The brazing powder used had the following composition:

| | Percent |
|---|---|
| Carbon _____max__ | .5 |
| Silicon _____ | 3.5 |
| Cobalt _____max__ | 1.0 |
| Boron _____max__ | 2.25 |
| Nickel _____ | Balance |

The brazing was carried out in a brazing bell which had been degreased, grit-blasted and then purged with specially dried argon for two hours at 2150° F. to degas the bell.

The actual brazing cycle was as follows, the bell was purged with dry argon at the rate of 12 cubic feet an hour for 20 minutes; the bell was then placed in a furnace and the temperature raised to 2150° F. and held for 5 minutes to permit melting and flow of the brazing alloy; the bell was then removed from the furnace and was rapidly cooled in air with a fan until the temperature of the bell reached 300° F. or lower; the bell was then opened. During the complete cycle, argon having a dew point of −140° F. was circulated through the bell at a flow rate of 12 cubic feet per hour.

Finally, the joined components were solution heat treated at 1975° F. for 8 hours, were cooled rapidly in air, were then aged at 1290° F. for 16 hours and finally cooled in air.

Upon visual examination it was found that the brazed specimens exhibited clean, oxide-free surfaces. Bond efficiencies in a series of similar tests were found to vary between 85 and 100%. Upon microscopical examination it was found that excellent flow had taken place even into areas with joint clearances below .0005 inch and only a few minor voids in the joints were detected.

The apparatus for preparing the very dry gas is commercially avaliable and need not be described in this application. The invention has been described with reference to argon or helium having a dew point at least as low as −100° F. Dew points down to −180° F. may be used and, generally speaking, the lower it is conveniently possible to get the dew point the better.

It will be seen that the invention provides a process for brazing nickel base alloys containing between about 3% and 8% that is comparatively simple and non-critical and which avoids the expensive and inconvenient nickel plating step heretofore necessary.

It will be understood that the form of the invention herewith shown and described is a preferred example and various modifications can be carried out without departing from the spirit of the invention or the scope of the appended claims.

What we claim as our invention is:

1. A method of joining together components made of nickel base alloys containing between about 3% and 8% total of aluminum plus titanium, which comprises treating the components in an oxidizing atmosphere prefernetially to oxidize the titanium and aluminum in surface zones of the components to a scale, removing the scale from said zones, while leaving the remainder of the zones intact, and brazing the components together at said zones in an atmosphere consisting of a gas selected from the group consisting of argon and helium, said atmosphere having a dew point at least as low as −100° F.

2. A method of joining together components made of nickel base alloys containing between about 3% and 8% total of aluminum plus titanium and capable of solution heat treatment, which comprises treating the components in an oxidizing atmosphere at approximately the solution heat treating temperature of the alloy preferentially to oxidize the titanium and the aluminum in surface zones of the components to a scale, removing the scale from said zones while leaving the remainder of the zones intact, and brazing the components together at said zones in an atmosphere consisting of a gas selected from the group consisting of argon and helium, said atmosphere having a dew point at least as low as −100° F.

3. A method of joining together components made of nickel base alloys containing between about 3% and 8% total of aluminum plus titanium and capable of solution heat treatment, which comprises treating the components in an oxidizing atmosphere at approximately the solution heat treating temperature of the alloy for a period of from about half an hour to about 3 hours preferentially to oxidize the titanium and the aluminum in surface zones of the components to a scale, removing the scale from said zones while leaving the remainder of the zones intact, and brazing the components together at said zones in an atmosphere consisting of a gas selected from the group consisting of argon and helium, said atmosphere having a dew point at least as low as −100° F.

4. A method of joining together components made of nickel base alloys containing between about 3% and 8% total of aluminum plus titanium, which comprises treating the components in an oxidizing atmosphere at a temperature of between about 1900° F. and 2200° F. preferentially to oxidize the titanium and the aluminum in surface zones of the components to a scale, removing the scale from said zones while leaving the remainder of the zones intact, and brazing the components together at said zones in an atmosphere consisting of a gas selected from the group consisting of argon and helium, said atmosphere having a dew point at least as low as −100° F.

5. A method of joining together components made of nickel base alloys containing between about 3% and 8% total of aluminum plus titanium, which comprises treating the components in an oxidizing atmosphere at a temperature of from about 1900° F. to 2200° F. for a period of from half an hour to 3 hours preferentially to oxidize the titanium and the aluminum in surface zones of the components to a scale, removing the scale from said zones while leaving the remainder of the zones intact, and brazing the components together at said zones in an atmosphere consisting of a gas selected from the group consisting of argon and helium, said atmosphere having a dew point at least as low as −100° F.

6. A method of joining together components made of nickel base alloys containing between about 3% and 8% total of aluminum plus titanium and capable of solution heat treatment, which comprises heating the components in air at approximately the solution heat treating temperature of the alloy preferentially to oxidize the titanium and the aluminum in surface zones of the components to a scale, removing the scale from said zones while leaving the remainder of the zones intact, and brazing the components together at said zones in an atmosphere consisting of a gas selected from the group consisting of argon and helium, said atmosphere having a dew point at least as low as −100° F.

7. A method of joining together components made of nickel base alloys containing between about 3% and 8% total of aluminum plus titanium, which comprises heating the components in air preferentially to oxidize the titanium and the aluminum in surface zones of the components to a scale, removing the scale from said zones while leaving the remainder of the surface zones intact, and brazing the components together at said zones in an atmosphere consisting of a gas selected from the group consisting of argon and helium, said atmosphere having a dew point at least as low as −100° F.

8. A method of joining together components made of nickel base alloys containing between about 3% and 8% total of aluminum plus titanium, which comprises heating the components in an oxidizing atmosphere preferentially to oxidize the titanium and the aluminum in surface zones of the components to a scale, etching the components with a chemical etch to remove the scale from said zones while leaving the remainder of the zones substantially intact, and brazing the components together at said zones in an atmosphere consisting of a gas selected from the group consisting of argon and helium, said atmosphere having a dew point at least as low as —100° F.

9. A method of joining together components made of nickel base alloys containing between about 3% and 8% total of aluminum plus titanium, which comprises heating the components in an oxidizing atmosphere preferentially to oxidize the titanium and the aluminum in surface zones of the components to a scale, treating the components with a pickle consisting essentially of water, nitric acid and hydrofluoric acid in the following proportions:

| | |
|---|---|
| $H_2O$ _____cc__ | 1000 |
| $HNO_3$ _____cc__ | 1000 |
| $HF$ _____cc__ | 150 | to remove the scale from said zones while leaving the remainder of the zones substantially intact, and brazing the components together at said zones in an atmosphere consisting of a gas selected from the group consisting of argon and helium, said atmosphere having a dew point at least as low as —100° F.

References Cited in the file of this patent

UNITED STATES PATENTS

| | | |
|---|---|---|
| 2,123,384 | Silliman | July 12, 1938 |
| 2,276,847 | Kelley | Mar. 17, 1942 |
| 2,508,465 | Offinger et al. | May 23, 1950 |
| 2,698,813 | Koh | Jan. 4, 1955 |
| 2,850,798 | Bowman et al. | Sept. 9, 1958 |

FOREIGN PATENTS

| | | |
|---|---|---|
| 475,925 | Canada | Aug. 7, 1951 |